UNITED STATES PATENT OFFICE.

RALPH W. CRARY, OF WAUKESHA, AND STEWART R. BARNETT, OF ALBANY, WISCONSIN, ASSIGNORS TO CRARY BROKERAGE COMPANY, OF WAUKESHA, WISCONSIN, A CORPORATION OF WISCONSIN.

FOOD PRODUCT AND METHOD OF PRODUCING THE SAME.

1,193,477. Specification of Letters Patent. Patented Aug. 1, 1916.

No Drawing. Application filed April 14, 1916. Serial No. 91,070.

*To all whom it may concern:*

Be it known that we, RALPH W. CRARY, a resident of Waukesha, Waukesha county, State of Wisconsin, and STEWART R. BARNETT, a citizen of the United States, residing at Albany, in the county of Green and State of Wisconsin, have invented a new and useful Food Product and Method of Producing the Same, of which the following is a specification.

The object of our invention is to produce a new food product composed of non-fatty portions of animal milk and the fixed fatty acids of alimentary vegetable oils, whereby the high value animal fats of animal milks may be utilized separate from milk and the low priced vegetable oils may be made palatable and available as foods.

It has heretofore been proposed to combine skimmed milk with vegetable oils, but heretofore proper care has not been exercised in the preliminary extraction of the free fatty acids of the vegetable oils and the vegetable oils have been combined with the skimmed milk prior to concentration. As a consequence, the free fatty acids of the vegetable oils have resulted in rancid tastes in the final product and the product has been non-uniform, owing to the difference in the specific gravity between the skimmed milk and the oils during the process of concentration.

In producing our improved product, we proceed in the following manner: An animal milk, such as cow's milk, is subjected to any well known process for the removal of butter fat as far as possible. Preferably this process includes a heating of the whole milk to about 98° F. and a mechanical separation of the butter fat therefrom, this separation being carried to a high degree in order that as much of the high-value butter fat be made available for separate sales as possible. Thereupon the skimmed milk is concentrated by the removal of a portion of the water in the usual manner of producing evaporated or condensed milk. Any well known process for accomplishing this result may be followed, but it is desirable to carry the process somewhat beyond the usual standards in order that the resultant product may be somewhat heavier in consistency than the desired final product, owing to the thinning effect of the oil which is to be added. After the concentration has been accomplished to the desired extent, an alimentary vegetable oil, from which the free fatty acids have been principally eliminated, is introduced into the concentrate and the mixture homogenized.

It is highly important that a thorough mixture and homogenization be accomplished in order that the ultimate product be uniform. It is also important that the free fatty acids of the oil be eliminated to a high degree before the oil is added to the concentrate.

The oil is, of course, of less specific gravity than the concentrate and ordinary methods of mechanical mixture, especially if the mixture is permitted to stand for any considerable period prior to homogenization, are not satisfactory.

Where ordinary mechanical mixing of the concentrate and oil is accomplished and the mixture then drawn off from the bottom of the mixing vessel, the lower strata of the mixture will be much less rich in oil than the upper strata, and a considerable portion of the oil, which inevitably rises to the top of the mixture, will stick to the walls of the mixing chamber. As a consequence, the product would be non-uniform and also inaccurate as to the proper porportioning of oil and milk solids.

In order to avoid the difficulties set forth above, we have found it extremely desirable to introduce the oil into the concentrate just prior to delivery to the homogenizer and in such manner that the oil is provided with an envelop of concentrate so that the oil does not come into direct contact with the supply piping of the homogenizer. In order to accomplish this, the oil is delivered to the concentrate through an aspirator, *i. e.*, through a small diameter tube which is projected into a larger diameter tube through which the concentrate is delivered to the homogenizer.

Any desired form of homogenizer may be used, several such devices being at present upon the market and their operations being well understood, the material delivered thereto being broken up and intimately associated by reason of the pressure under which the material is driven through the homogenizer. By the method described, the mixture, in the form of an infinite number of infinitely thin disks, composed of a center of oil and a surrounding ring of concentrate, is delivered to the homogenizer, and, as a consequence, an exceedingly uniform product having definitely proportioned amounts of oil and milk solids not fats, is produced. After the product leaves the homogenizer, it is packaged in any usual manner.

The precise proportion of oil to milk solids not fats may of course, be readily determined and varied by a control of the amount of oil delivered through the aspirator.

If the oil is introduced into the milk before concentration, the heating of the mixture necessary for purposes of concentration, results in a thinning of the oil so that it is practically impossible to maintain a uniform mixture during concentration, and, as a consequence, the upper strata are richer in oil than the lower strata, and a considerable proportion of the oil would be lost both by volatilization and by adherence to the walls of the concentrating chamber.

In practice, we have found that, while many of the alimentary vegetable oils are satisfactory, cocoanut oil, from which the free fatty acids have been carefully removed, produces a product of exceptionally high character and pleasing taste.

We claim as our invention:

1. That improvement in the art of producing a food product from animal milk, which comprises the addition to a concentrate of skimmed milk, of an alimentary vegetable oil and the homogenization of said mixture.

2. That improvement in the art of producing a food product, which comprises the addition to a concentrate of skimmed cow's milk of an alimentary vegetable oil from which the free fatty acids have been removed, and the homogenization of said mixture.

3. That improvement in the art of producing a food product, which comprises the addition to a concentrate of skimmed cow's milk of an alimentary vegetable oil, and the homogenization of said mixture.

4. That improvement in the art of producing a food product, which comprises the addition to a concentrate of skimmed cow's milk of cocoanut oil from which the free fatty acids have been removed, and the homogenization of said mixture.

5. As an article of manufacture, a food product composed of a homogenized mixture of a concentrate of skimmed animal milk to which has been added, after concentration, an alimentary vegetable oil from which the free fatty acids have been removed.

6. As an article of manufacture, a food product composed of a concentrate of skimmed animal milk homogenized in successive small quantities with proportioned quantities of an alimentary vegetable oil associated with the concentrate immediately prior to homogenization.

7. As an article of manufacture, a food product consisting of a concentrate of skimmed cow's milk and cocoanut oil from which the free fatty acids have been removed, the mixture being homogenized.

8. As an article of manufacture, a homogenized compound resulting from the homogenization of an envelop of concentrated skimmed cow's milk, and a core of alimentary vegetable oil from which the free fatty acids have been removed.

9. As an article of manufacture, a homogenized compound resulting from the homogenization of an envelop of concentrated skimmed cow's milk and a core of cocoanut oil from which the free fatty acids have been removed.

10. That improvement in the art of producing a food product from animal milk, which comprises the injection of a core of an alimentary vegetable oil into an envelop of a concentrate of skimmed milk, and the prompt treatment of said envelop and core in successive portions by a homogenizer.

11. That improvement in the art of producing a food product from animal milk, which comprises the injection of a core of an alimentary vegetable fat, from which the free fatty acids have been removed, into an envelop of a concentrate of skimmed milk, and the prompt treatment of said envelop and core in successive portions by a homogenizer.

12. That improvement in the art of producing a food product from cow's milk, which comprises the injection of a core of an alimentary vegetable oil into an envelop of a concentrate of cow's milk, and the prompt treatment of said envelop and core in successive portions by a homogenizer.

13. That improvement in the art of producing a food product, which comprises the injection of a core of an alimentary vegetable oil, from which the free fatty acids have been removed, into an envelop of a concentrate of cow's milk, and the prompt treatment of said envelop and core in successive portions by a homogenizer.

14. That improvement in the art of producing a food product, which comprises the injection of a core of cocoanut oil into an envelop of cow's milk, and the prompt treatment of said envelop and core in successive portions of a homogenizer.

15. That improvement in the art of producing a food product, which comprises the injection of a core of cocoanut oil, from which the free fatty acids have been removed, into an envelop of cow's milk, and the prompt treatment of said envelop and core in successive portions by a homogenizer.

In witness whereof, we have hereunto set our hands at Waukesha, Wisconsin, this tenth day of April, A. D. one thousand nine hundred and sixteen.

RALPH W. CRARY.
STEWART R. BARNETT.

Witnesses for Crary:
  FRED J. STRONG,
  JOHN J. STAUB.
Witnesses for Barnett:
  CHAS. E. HUGHES,
  FRED WINSHELL.